United States Patent [19]
Blalock et al.

[11] Patent Number: 5,729,008
[45] Date of Patent: Mar. 17, 1998

[54] METHOD AND DEVICE FOR TRACKING RELATIVE MOVEMENT BY CORRELATING SIGNALS FROM AN ARRAY OF PHOTOELEMENTS

[75] Inventors: Travis N. Blalock, Santa Clara; Richard A. Baumgartner, Palo Alto; Thomas Hornak, Portola Valley; Mark T. Smith, San Mateo, all of Calif.

[73] Assignee: Hewlett-Packard Company, Palo Alto, Calif.

[21] Appl. No.: 591,847

[22] Filed: Jan. 25, 1996

[51] Int. Cl.⁶ .................................. H01J 40/14
[52] U.S. Cl. .................. 250/208.1; 250/234; 358/482; 358/488; 358/497
[58] Field of Search .................. 250/234, 559.29, 250/559.3, 559.32, 559.33, 559.34, 559.36, 559.37, 559.39, 548, 208.1; 358/474, 482, 483, 486, 488, 496, 497, 473; 348/86, 88, 94, 95, 169

[56] References Cited

U.S. PATENT DOCUMENTS

| | | | |
|---|---|---|---|
| 4,133,004 | 1/1979 | Fitts | 358/125 |
| 4,270,143 | 5/1981 | Morris | 358/125 |
| 4,958,224 | 9/1990 | Lepore et al. | 358/126 |
| 5,089,712 | 2/1992 | Holland | 250/559.32 |
| 5,149,980 | 9/1992 | Ertel et al. | 250/561 |
| 5,216,258 | 6/1993 | McConnell | 250/559.32 |
| 5,578,813 | 11/1996 | Allen et al. | 250/208.1 |

*Primary Examiner*—Edward P. Westin
*Assistant Examiner*—John R. Lee

[57] ABSTRACT

A method and device for tracking relative movement between the device and a region of interest include correlating a reference frame of signals with a subsequently acquired sample frame of signals, with the correlating including generating a correlation output for each of a number of nearest-neighbor shifts of signals of one of the frames. Preferably, the frames are comprised of a two-dimensional array of pixels and the signals are pixel values. The pixels of a frame are operatively associated with photoelements in a two-dimensional array of photoelements, with the pixel values being indicative of light energy received at the photoelements. By correlating the reference frame and the sample frame using the nearest-neighbor approach, it is possible to determine the movement of an imaged feature during the time period between acquisition of the reference frame and acquisition of the sample frame. In the preferred embodiment, the pixel values of the reference frame may be selectively shifted to correspond to the movement of the image feature, allowing the nearest-neighbor approach to continue even after the relative movement exceeds a pixel length. Also in the preferred embodiment, the device is a scanner having a second photoelement array. The second photoelement array captures image data which is position-tagged by navigation data acquired by means of the correlation of reference and sample frames.

20 Claims, 5 Drawing Sheets

METHOD AND DEVICE FOR TRACKING RELATIVE MOVEMENT BY CORRELATING SIGNALS FROM AN ARRAY OF PHOTOELEMENTS

TECHNICAL FIELD

The invention relates generally to methods and devices for tracking relative movement between a device and a region of interest and more particularly to tracking relative movement by means of signals from an array of photoelements.

BACKGROUND ART

An accurate determination of the path of movement of a device relative to a surface of interest is important in a variety of applications. For example, if a faithful representation of an image of a scanned original is to be acquired, there must be accurate information as to the travel of the scanning device along the original. Typically, the captured image provided by a scanner is a pixel data array that is stored in memory in a digital format. A distortion-free image requires a faithful mapping of the original image to the pixel data array.

U.S. Pat. No. 5,149,980 to Ertel et al., which is assigned to the assignee of the present invention, describes use of a cross-correlation function to determine the relative movement between an original and an array of photoelements in a given direction. The patent notes that the one-dimensional approach can be extended to determine the vector of two-dimensional relative movement between the original and the array, so as to track translation, rotation and scaling in a two-dimensional plane.

The patent to Ertel et al. describes use of an optical sensor array to collect a "signature" of the original. The signature may be provided by illuminating and imaging the surface texture or other optical characteristics of the original. The light intensity will vary on a pixel-by-pixel basis with variations in surface texture. By cross-correlating images of the surface of the original, relative movement between the array and the original can be ascertained.

The cross-correlation of Ertel et al. includes forming a first array of light-strength values $s_1(k)$ ($k=1, 2, \ldots, N$) that are determined prior to movement of an original, such as a sheet of paper. The sheet is then moved and a second array of light-strength values $s_2(k)$ ($k=1, 2, \ldots, N$) is determined for the sheet. A cross-correlation function is formed from the sum of a sequence of cross-correlation terms $s_1(k+i-1)$ $s_2(k+K-1)$ for a selected integer K. The cross-correlation function value is then maximized by the choice of K, or of its corresponding continuum value, e.g. $K=K_0$, and the distance D the sheet has moved in the given direction is determined to be $D \approx (MF)(K_0-i)d$, where d is the distance between two consecutive photoelements, including any optical magnification effects (MF), and i is an integer representing initial position of a sensor group for monitoring the sheet "signature."

While the Ertel et al. cross-correlation process operates well for its intended purpose, its application to determining movement within a two-dimensional scheme requires sequential maximization of two or three cross-correlation functions, each having two or three variables with respect to which maximization is performed. The patent itself notes that the computational complexity of the two-dimensional extension is daunting, compared to the computational complexity of the one-dimensional approach.

What is needed is a method and device for tracking relative movement of the device relative to a region of interest, while accommodating curvilinear relative movement without a high degree of computational complexity.

SUMMARY OF THE INVENTION

A method and device for tracking relative movement between a device and a region of interest, such as the surface of a substrate being scanned, includes fixing at least one two-dimensional array of photoelements to the device such that the photoelements generate output signals responsive to light energy received from the region of interest, and further includes using a next-nearest neighbor approach in correlating outputs of the array. Frames of signals indicative of received light energy are captured, with each signal in a frame being operatively associated with a single photoelement in the array. Relative movement is tracked by determining a correlation between the signals of a first frame and the signals of a second frame. An overall correlation is determined by summations at individual correlations for each of the signals within the first frame. The summations of individual correlations are along eight directions of motion in a plane, each rotated from the previous by 45 degrees. A ninth sum is for the no motion case. Individual correlations respond to a particular signal at the first frame and to either the respective signal of the second frame or a nearest-neighbor of the respective signal within the second frame.

The correlation of signals of the first and second frames includes a number of substeps. Firstly, an individual signal of the first frame is selected. While not critical, the processing may be analog processing and the signals of the frames may be captured pixel values. The selected individual signal of the first frame corresponds to an individual photoelement of the array of photoelements. Secondly, a number of signals in the second frame are selected. In the preferred embodiment, the selected second frame signals are the ones that correspond to the individual photoelement identified with respect to the first frame and to the photoelements that surround the individual photoelements, i.e. the nearest-neighbor photoelements. While not critical, nine signals are selected from the second frame, with eight of the second frame signals corresponding to the nearest-neighbor photoelements and the ninth signal being the respective signal with regard to the selected individual signal of the first frame.

In the next substep of the correlation process, the correlation outputs are generated. The correlation outputs are responsive to the selected individual signal of the first frame and one of the signals of the second frame. Again referring to the preferred embodiment, there will be nine correlation outputs related to the selected individual signal of the first frame.

Preferably, the substeps for generating correlation outputs are executed for other selected signals of the first frame. The preferred embodiment is one in which correlation outputs are generated for each signal in the first frame, with the execution of the substeps being performed simultaneously and in the same order with respect to the nearest-neighbor processing. A summing circuit may be connected to provide summations of the correlation outputs.

In the preferred embodiment, each correlation output may be the square of the difference between a pixel value of the first frame and one of the nine relevant pixel values of the second frame. However, other algorithms for generating correlation outputs may be substituted.

The correlation process may be used to determine travel during the time period between acquiring the first frame of signals and acquiring the second frame of signals. Preferably, the frames are captured sufficiently rapidly that the relative movement is less than one pixel length between successive frames. A key advantage of the analog signal processing method is that it provides the capability of executing the data acquisition and signal processing quickly enough to allow the user to move the device, e.g., a hand-held scanner, at a reasonably high velocity without adversely affecting processing operations.

Following the correlation of the first and second frames of signals, the second frame may be stored and the correlation process may be continued by utilizing the second frame and a third frame that is acquired subsequent to the second frame. Alternatively, the signals of the first frame may be shifted uniformly, effectively translating the image of the region of interest. The signals of the translated frames are then correlated to signals of the subsequently acquired third frame.

The method and device may be used in a wide variety of applications. In the preferred embodiment, the device is a hand-held scanner and the two-dimensional array of photoelements is a navigation sensor that is adjacent to an image sensor. The navigation data acquired during the correlation process is used to arrange image data from the image sensor in order to increase correspondence between a scanned original and an output image.

An advantage of the invention is that the nearest-neighbor architecture may be used to determine cross-correlations with relative displacements of a single pixel distance. Another advantage is that by allowing the reference image to be translated, cross-correlations across multiple pixel distances may be tracked between a reference image and a comparison image. The method and device generate nearest-neighbor image cross-correlations in two dimensions for optical navigation of a scanned original. The array has the ability of loading and storing a reference image and a comparison image in the analog domain. Moreover, cross-correlation is achieved with very low power and high speed.

By applying the inventive method in the scanner industry, a scanner is afforded three degrees of freedom of movement. If the original is planar, two of the degrees of freedom are translational and are perpendicular to each other within the plane of the original, while the third degree of freedom is rotational about the normal to the plane of the original. The accuracy of rotation tracking is enhanced by the use of two navigation arrays, with the arrays being at opposite ends of the image sensor.

BEST MODE FOR CARRYING OUT THE INVENTION

Figure 1:
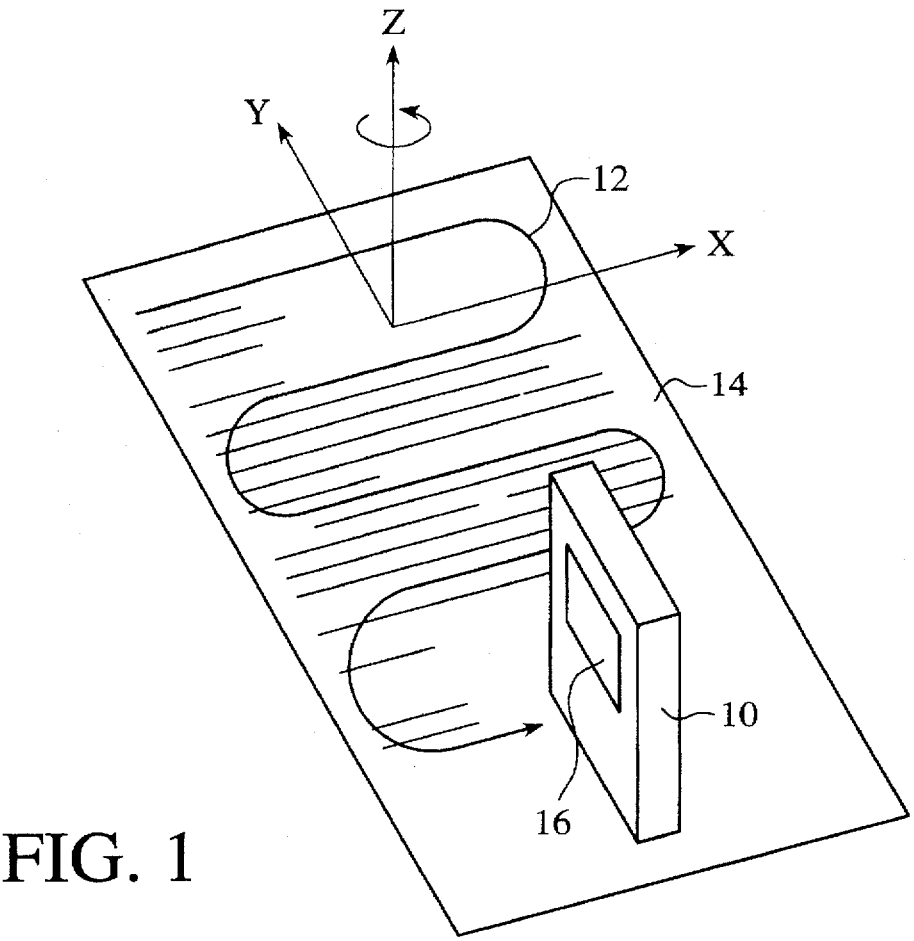
FIG. 1 is a perspective view of a hand-held scanning device following a meandering path on an original.

With reference to FIG. 1, a portable, hand-held scanning device 10 is shown as having followed a meandering path 12 along an original 14. The original may be a piece of paper, but the invention may be used with other image-bearing originals. In use of the hand-held scanning device, the positions of inherent structural features, such as paper fibers, may be tracked and the resulting positional information may be used to rectify image data. However, the invention may be used in other applications, including integrated circuit fabrication.

The scanning device 10 is preferably self-contained and battery operated. However, the device may include a connection to an external source of power or to data ports of computers or networks. The scanning device includes an image display 16. The display may provide almost immediate viewing of a captured image. The display is not critical.

The scanning device 10 allows three degrees of freedom, with two being in translation and one in rotation. As shown in FIG. 1, the first degree is the side-to-side movement (X axis movement) along the original 14. The second degree of freedom is movement upwardly and downwardly along the original (Y axis movement). The third degree of freedom is the ability to operate the device with rotational misalignment of a linear array of image sensor elements relative to the edge of the original 14 (θ misalignment as a result of Z axis movement). That is, it is not necessary to maintain the linear array of imaging elements perpendicular to the direction of device translation.

Figure 2:
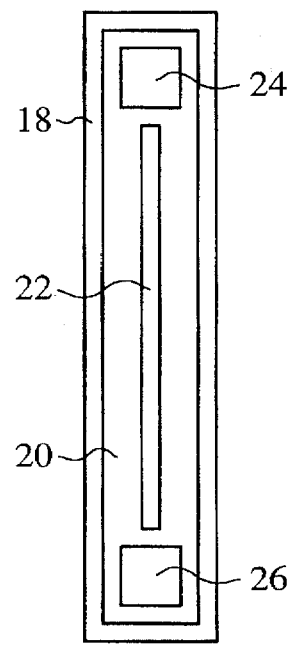
FIG. 2 is a rearward view of imaging and navigation sensors of the scanning device of FIG. 1.

Referring now to FIGS. 1 and 2, the bottom side 18 of the scanning device 10 includes a pivoting member 20 that aids in maintaining proper contact between the original 14 and an imaging sensor 22. Navigation sensors 24 and 26 are located at the opposed ends of the imaging sensor. Because the navigation sensors are mounted on the pivoting member, the navigation sensors are in a fixed location relative to the imaging sensor.

For reasons of physical compactness, the imaging sensor 22 is preferably a contact image device, but for applications in which compactness is less of a concern or a smaller image is desired, sensors employing projection optics may be employed, with magnification less than unity. Contact imaging devices typically employ lenses sold under the trademark SELFOC, which is a federally-registered mark of Nippon Sheet Glass Company Limited. Less conventionally, contact imaging can be obtained using interleaved array elements of sources and proximal sensors, without any imaging lenses. Conventional imaging sensors for scanning applications may be used. The imaging sensor may be part of a unit that also includes an illumination source, illumination optics, and image transfer optics.

In FIG. 1, the meandering path 12 is shown as having four and a fraction swaths, i.e., side-to-side passes across the original 14. A useful imaging sensor 22 for most applications has a length within the range of 25 mm and 100 mm. The swaths should include regions of overlap, so that a stitching process may be used to produce a faithful representation of the scanned original.

NAVIGATION SENSORS

The scanning device 10 includes at least one navigation sensor 24 or 26. In the preferred embodiment, the device includes a pair of navigation sensors, with the sensors being at opposite ends of the imaging sensor 22. The navigation sensors 24 and 26 are used to track movement of the scanning device 10 relative to the original.

Each navigation sensor is an array of photoelements that is formed on an integrated circuit substrate that includes readout and signal processing circuitry. The position accuracy necessary over the range of a pixel distance of 40 μm is 2.0 μm. The very high positional accuracy requires individual photoelements that are no larger than tens of microns in length in order to acquire sufficiently differing signals from element to element. In the preferred embodiment, the pixel size desired on the paper original 14 is 40 μm and a magnification of 1.5 is achieved by the imaging optics, so that the photoreceptor elements of the navigation sensors 24 and 26 are 60 μm×60 μm.

Figure 3:
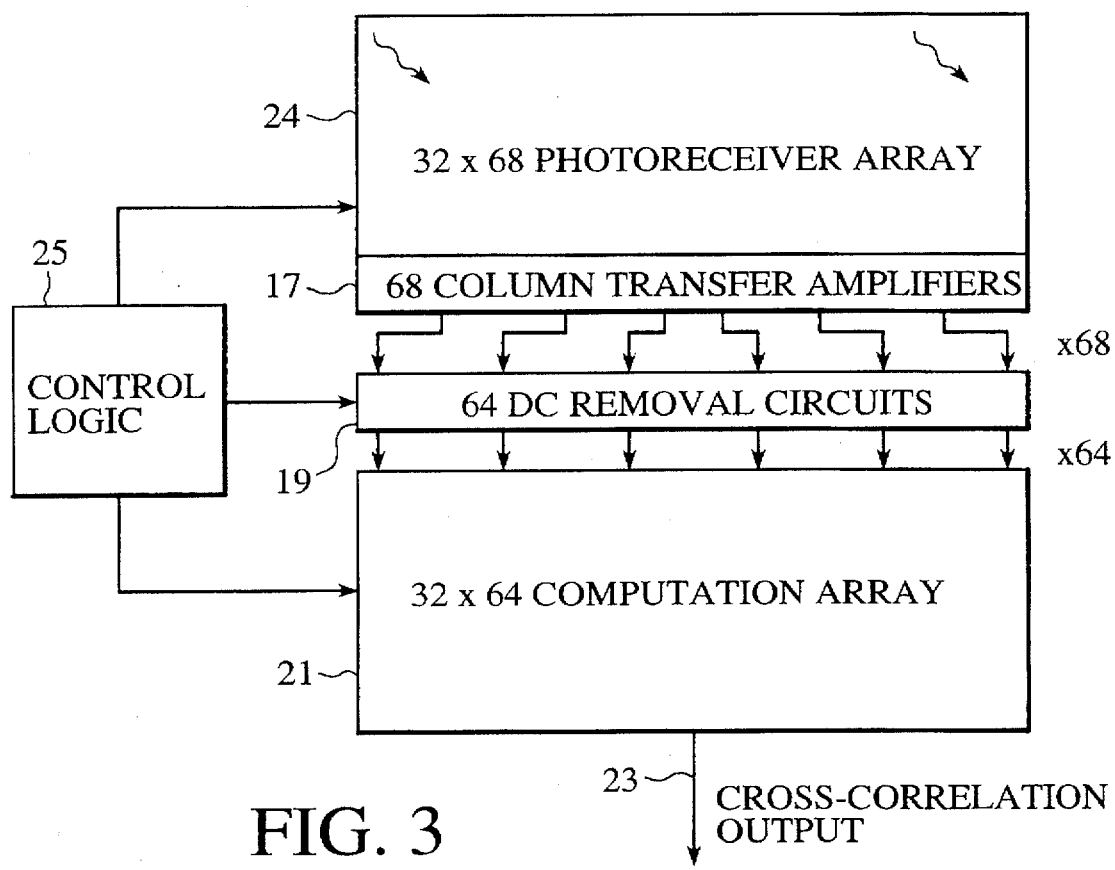
FIG. 3 is a block diagram of a photoreceiver array and processing circuitry in accordance with the invention.

FIG. 3 is a block diagram of circuitry to be preferably formed in a single integrated circuit chip. The chip is an analog signal processing chip designed to acquire and process two-dimensional images, providing cross-correlation information to an external controller, not shown. In the embodiment described above, the controller uses the image cross-correlation values to derive X-Y position information. The X-Y position information is then used to accurately reconstruct a linear image from the image data acquired using imaging sensor 22 in FIG. 2.

In the embodiment of FIG. 3, the navigation sensor 24 is an array having thirty-two rows and sixty-eight columns of photoelements. An array of sixty-eight column transfer amplifiers 17 transfers signals in a row-to-row fashion from the navigation sensor 24 to an array of sixty-four DC removal circuits 19. In a cost-efficient image-capture system, it is difficult to illuminate a target area with perfectly consistent light intensity across the entire area to be imaged. The ability to provide uniform illumination is often proportional to the cost of the optics and the light source. Moreover, in the absence of cell-by-cell calibration of a conventional integrated light sensor, some variations in sensitivity will occur as a result of limitations of integrated circuit processing technology. In the navigation system for use with the analog signal processing chip of FIG. 3, it is required that cross-correlations be calculated between an incident image and an image captured previously at a different location relative to an imaging array. Any variations in illumination and photoelement sensitivity will degrade the correlation signal. Consequently, the spatial DC removal circuits 19 of FIG. 3 have been designed to maintain the integrity of the correlation signals, while keeping the cost of the system relatively low. Low spatial frequency changes in illumination and photoelement sensitivity which would otherwise corrupt the correlation signal are removed from the navigation image. A computational array 21 receives data from the DC removal circuits 19 and performs computations on the data before transferring a cross-correlation output 23 to the off-chip controller. Also shown in FIG. 3 is a source 25 of control logic for the various components of the chip.

An understanding of the operation of the DC removal circuits 19 is not critical to a full understanding of the operation of the computational array 21, and is therefore not described in detail. However, it is useful to understand the basic operation of the column transfer amplifiers 17.

COLUMN TRANSFERS OF PHOTOELEMENT SIGNALS

Figure 4:
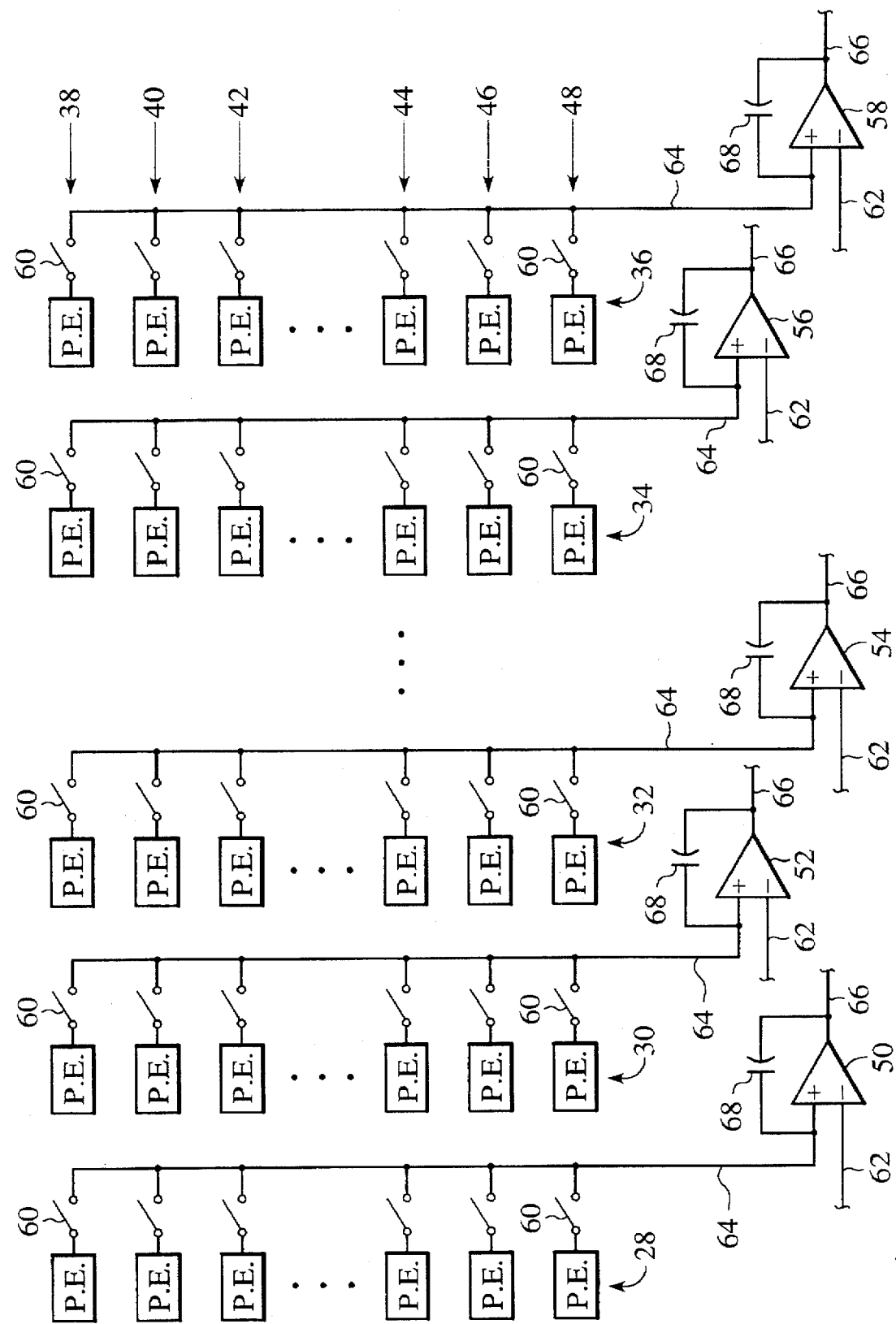
FIG. 4 is a block diagram of an array of photoelements and transfer amplifiers of the processing circuitry of FIG. 3.

Referring to FIG. 4, five columns 28, 30, 32, 34 and 36 of the sixty-eight columns of photoelements are shown. For each of the columns, six of the thirty-two rows 38, 40, 42, 44, 46 and 48 are represented. Each column is operatively associated with a separate transfer amplifier 50, 52, 54, 56 and 58. A photoelement in a column is connected to the operatively associated transfer amplifier by closing a read switch 60. In the operation of the circuitry of FIG. 4, no two photoelements are connected to the same transfer amplifier simultaneously.

Each transfer amplifier 50–58 operates as an integrator and includes an input 62 that is connected to a source of a fixed voltage. A second input 64 is capacitively connected to the output 66 of the transfer amplifier by a transfer capacitor 68.

In the operation of the circuit of FIG. 4, the read switches of the first row 38 of photoelements may be closed, so that each transfer capacitor 68 receives a charge corresponding to the light energy that is received at the associated photoelement in the first row. The received charge is transferred to subsequent processing circuitry via the output lines 66. The readout of a single row is estimated to be between 200 ns and 300 ns. Following the readout of the first row, the read switches of the first row are opened and the transfer amplifiers are reset. The read switches of the second row 40 are then closed in order to transfer the signals from the photoelements of the second row. The process is repeated until each row of photoelements is read.

By the operation of the transfer amplifiers 50–58 of FIG. 4, photoelement signals are transferred in a row-by-row fashion to subsequent circuitry. The DC removal circuits 19 of FIG. 3 continue the parallel processing of photoelement signals, as established by the column transfer amplifiers. The DC removal circuits output sixty-four signals and are representative of light energy received at the navigation sensor 24. In the embodiment of FIG. 3, a frame of signals is comprised of pixel values at the computational array, with the pixel values being acquired by thirty-two transfers of sixty-four signals from the DC removal circuits.

NAVIGATION PROCESSING

Figure 5:
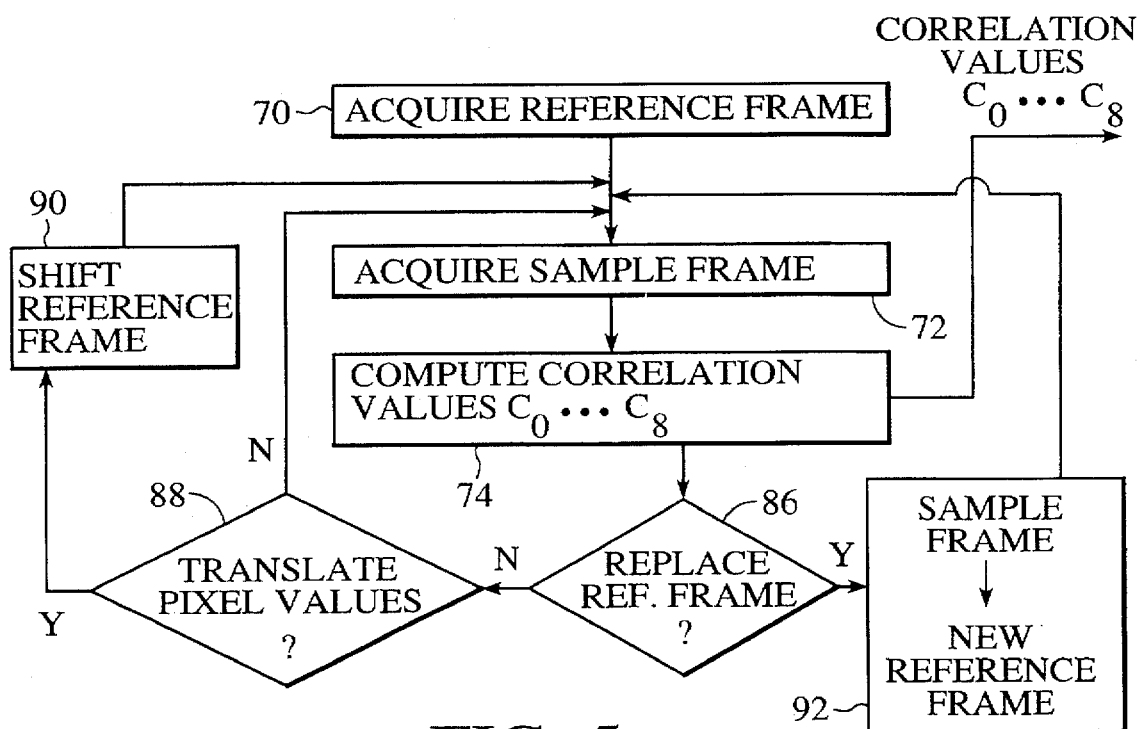
FIG. 5 is an operational view of one embodiment of the navigation processing of the scanning device of FIG. 1.

FIG. 5 illustrates the steps for carrying out the invention for tracking relative movement between a device and a region of interest. While the invention will be described with reference to processing photoelement signals indicative of images of inherent structural features such as paper fibers of a sheet of paper, the method is not restricted to any one application.

The steps of FIG. 5 are performed to correlate successive frames of navigation information. In effect, the correlations compare the positions of imaged features in successive frames to provide information related to the position of the navigation sensor at a particular time. In the application of the process to scanners, the detection of correlations is then used to process image data generated by the imaging sensor 22 to accurately represent the original.

In a first step 70, a reference frame of signals is acquired. The reference frame may be considered to be a start position. The position of a navigation sensor relative to an imaged region at a later time may be determined by acquiring 72 a sample frame of signals from the navigation sensor at the later time and then computing correlation values 74 with respect to the reference frame and the later-acquired sample frame.

Acquiring the initial reference frame 70 may take place upon initiation of the imaging process. For example, the acquisition may be triggered by mere placement of the scanning device into contact with the original. Alternatively, the scanning device may include a start button that initiates the image process and the navigation process.

While the navigation processing is performed computationally, the concepts of this embodiment may be described with reference to the conceptual view of FIG. 6. A reference frame 76 of 7×7 pixels is shown as having an image of a T-shaped inherent structural feature 78. At a later time (dt) a navigation sensor acquires a sample frame 80 which is displaced with respect to frame 76, but which shows substantially the same inherent structural features. The duration dt is preferably set such that the relative displacement of the T-shaped feature 78 is less than one pixel of the navigation sensor at the velocity of translation of the scanning device. This relative displacement is referred to herein as a "microstep."

If the scanning device has moved during the time period between acquiring the reference frame 76 of signals and acquiring the sample frame 80 of signals, the T-shaped feature will be shifted. While the preferred embodiment is one in which dt is less than the time that allows a full-pixel movement, the conceptual representation of FIG. 6 shows that the feature 78 has shifted upwardly and to the right by one full pixel. The full-pixel shift is assumed only to simplify the representation.

Figure 6:
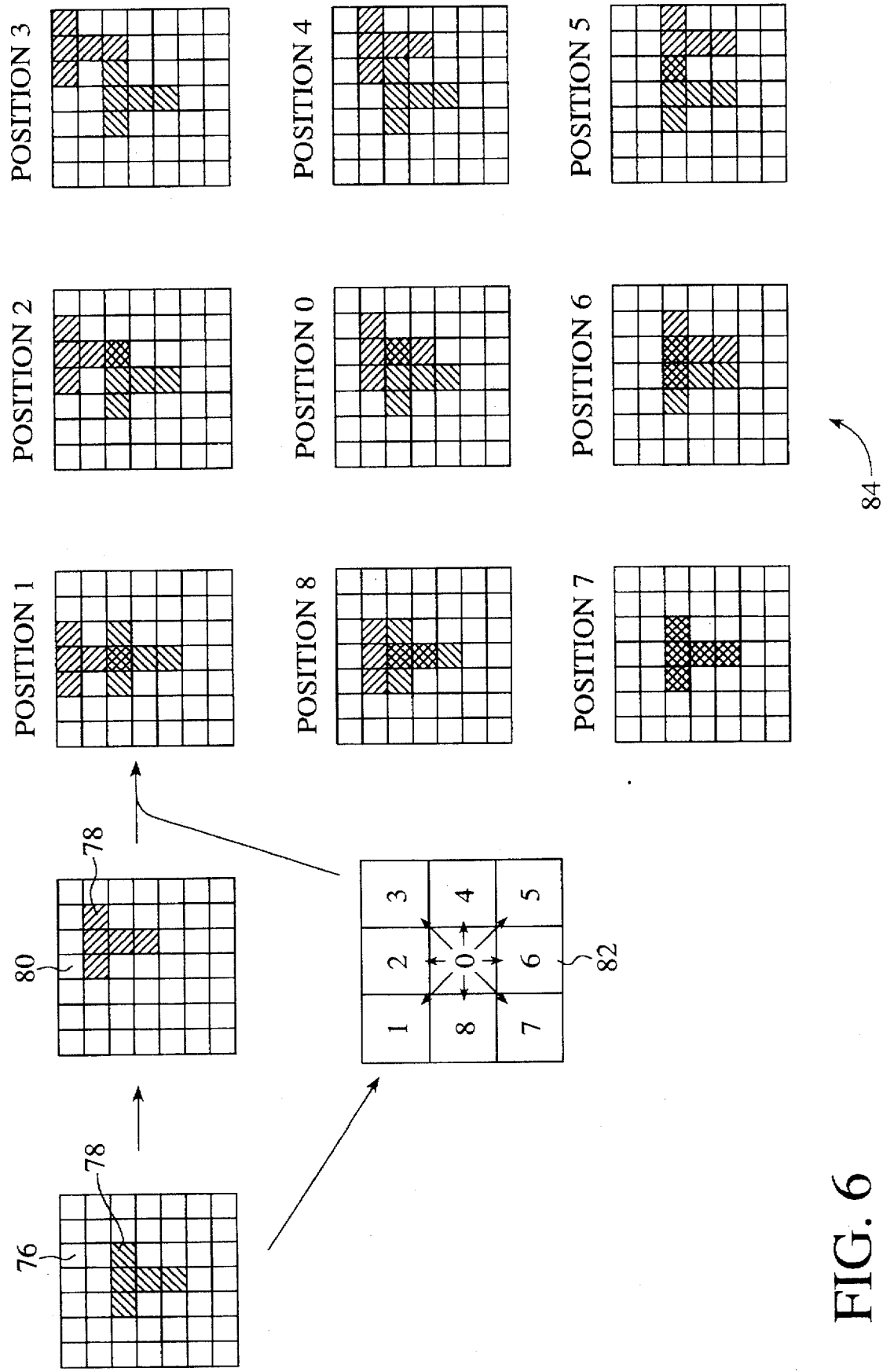
FIG. 6 is a schematical view of selected steps of FIG. 5.

Member 82 in FIG. 6 represents sequential shifts of a pixel value of a particular pixel within the 7×7 array of frame 80. The sequential shifts are individual offsets into the eight nearest-neighbor pixels. That is, step "0" does not include a shift, step "1" is a diagonal shift upward and to the left, step "2" is an upward shift, etc. The shifts are performed simultaneously for all of the pixels of the sample frame 80. In this manner, the nine pixel-shifted frames can be combined with the reference frame 76 to produce the array 84 of position frames. The position frame designated as "Position 0" does not include a shift, so that the result is merely a combination of frames 76 and 80. "Position 7" has the minimum number of shaded pixels, and therefore is the frame with the highest correlation. Based upon the correlation results, the position of the T-shaped feature 78 in the sample frame 80 is determined to be a diagonal rightward and upward shift relative to the position of the same feature in earlier-acquired reference frame 76, which implies that the scanning device has moved leftwardly and downwardly during time dt.

While other correlation approaches may be employed, an acceptable approach is a "sum of the squared differences" correlation. For the embodiment of FIG. 6, there are nine correlation coefficients ($C_k=C_0, C_1 \ldots C_8$) formed from the nine offsets at member 82. Another option regards the shifting of the sample frame 80, since the correlation operates equally well by offsetting the reference frame 76 and leaving the sample frame unshifted.

Correlations are used to find the locations of identical features 78 in successive frames 76 and 80 in order to determine the displacements of the features from frame-to-frame. Summing or integrating these displacements determines the displacements of the imaging sensor as a scanning procedure progresses.

As previously noted, the frame-to-frame correlations are referred to as "microsteps," since frame acquisition rates are chosen to be sufficiently high to ensure that the displacements do not exceed the dimension of a single pixel. Referring to FIG. 5, a determination 86 of whether to replace the reference frame prior to subsequent correlation processing is made following each computation of the correlation values at step 74. If it is determined that the reference frame is not to be replaced, a determination is made at step 88 as to whether to translate the signals, i.e., the pixel values, of the reference frame. If the T-shaped feature 78 of FIG. 6 has been displaced by a full pixel value from the acquisition of the reference frame 76 to the acquisition of the sample frame 80, the pixel values of the reference frame 76 may be shifted upwardly and to the right to form a translated reference frame. This is shown at step 90 in FIG. 5. The shifted reference frame may then be compared to a new sample frame acquired at step 72. The decision not to translate the pixel values will be made when the imaged feature has undergone a relative displacement of only a small portion of the pixel distance.

Returning to step 86, if the determination is made to replace the reference frame, the sample reference frame 80 in FIG. 6 becomes the new reference frame, as shown at step 92 in FIG. 5. A new sample frame is then acquired at step 72 and the process continues. While the process provides a high degree of correlation match, any errors that do occur will accumulate if the reference frame is not periodically replaced, but is instead periodically shifted at step 90. In order to place a restriction on the growth rate of this "random walk" error, a new reference frame is acquired at step 92. Merely as an example, the reference frame may be systematically replaced before any fifth shift can occur at step 90.

Based upon the tracking of movement of the imaged features, the relative movement between the photoreceiver array and the region being imaged may be tracked. In the application of the invention to a scanning device 10 as shown in FIGS. 1 and 2, this navigation information can then be used to arrange the image information from the imaging sensor 22, so as to provide a faithful representation of the image of the original. In one form of the arranging of the image information, the navigation information may be used to position-tag the image information.

COMPUTATIONAL CELL

Figure 7:
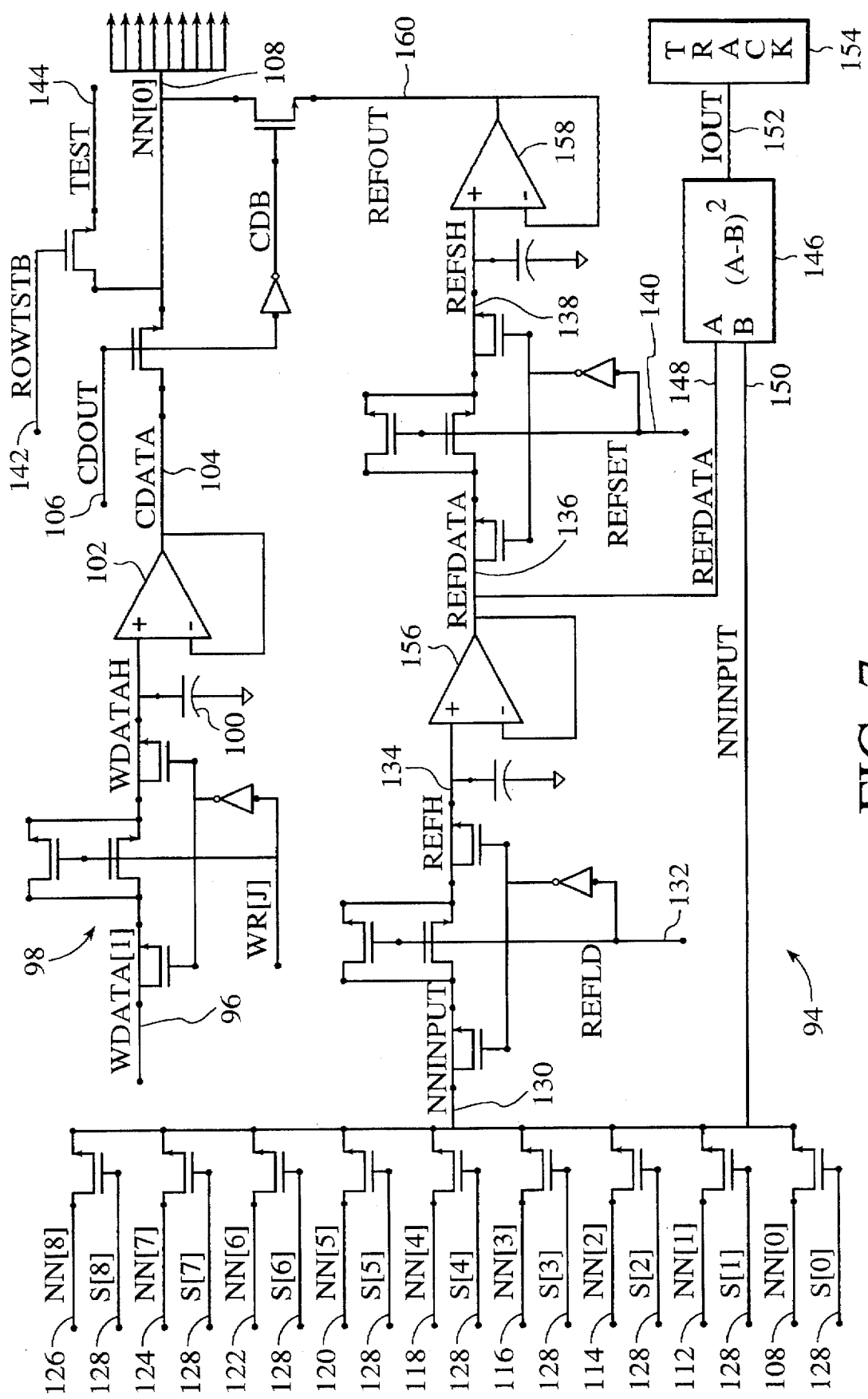
FIG. 7 is an embodiment of a computation cell of the computational array of FIG. 3.

FIG. 7 is a schematic diagram of an individual cell within the computational array 21 of FIG. 3. However, as will be understood by persons skilled in the art, other circuits may be used to carry out the process steps described with reference to FIGS. 5 and 6.

Image data WDATA(i) is representative of light energy from a particular photoelement loaded into the computational cell 94 at line 96, with a charge compensated transistor switch 98 under the control of a WR(j) signal. After the WR(j) signal is deasserted, the new data is held on capacitor 100 and is buffered by an amplifier 102. The computational cell is a data cell within a two-dimensional array of cells. Referring briefly to FIG. 6, the cell may be used to store pixel values and to shift the pixel values for a single pixel in the 7×7 array that comprises frames 76 and 80. The CDATA node 104 of FIG. 7 is one CDATA node within the computational array that permits simultaneous signal processing of all pixels of a frame of signals. Initially, the array of CDATA nodes collectively forms the comparison image, or "reference frame." As will be explained below, the CDATA nodes subsequently form the sample frame. Control input CDOUT 106 selects signal CDATA, comparison data, or selects REFOUT for the nearest-neighbor output node NN(0) 108.

The nearest-neighbor inputs NN(0)–NN(8) 108, 112, 114, 116, 118, 120, 122, 124 and 126 are separately selected by means of switch control signals S(0)–S(8) on lines 128. The NN(0)–NN(8) inputs 108–126 are the outputs of the nearest-neighbor cells according to the pixel map 82 of FIG. 6. Consequently, the node 108 is shown both as an output that fans out for connection to nearest-neighbor cells and as an input for the cell 94. The switch control signals are generated by a 4–9 encoder, not shown, that is external to the computational array. The 4-bit input to the encoder is referred to as the nearest-neighbor address and takes on binary values from 0000(0) to 1000(8).

The nearest-neighbor input (NNINPUT) node 130 is sampled by pulsing REFLD 132, thereby storing the NNINPUT on node REFH 134. Similarly, REFDATA 136 can be sampled and held on REFSH 138 by pulsing REFSFT 140.

For testing, ROWTSTB 142 can be asserted, allowing the NN(0) signal to propagate to the TEST output 144. The TEST signals from each cell in a row of cells connect to common vertical buses in each column of the computational array and are multiplexed at the bottom of the array and driven off-chip. A standard row decoder along the left edge of the array allows selection of a particular row for test. However, the test feature is not critical to the invention.

Each computation cell 94 in the array of cells has a circuit 146 that determines the correlation values identified in FIG. 5 with reference to step 74. A first input 148 receives the reference data from REFDATA node 136. A second input 150 provides the nearest-neighbor input NNINPUT selected by the appropriate switch control signal at lines 128. The output 152 of the correlation cell is a current. All of the correlation outputs in the computational array are summed together in a single off-chip summing resistor of a tracking circuit 154. The voltage developed across the summing resistor is referred to as the correlation values in FIG. 5.

In the embodiment of FIG. 7, the circuit 146 is based on a squared-difference calculation. The cell 94 may be modified to provide product-based correlations without modifying the basic architecture of the array Control inputs S(0)–S(8), REFLD, REFSFT and CDOUT are global to the entire array.

It is important to understand the relationship between the nearest-neighbor map represented by 82 in FIG. 6 for a single cell and for the array as a whole. Location 0 of an image refers to the present location of the image. When referring to the movement of an image from location 0 to location 1, the representation is that the image signals in all of the cells of the array are moved to the neighbor cell that is to the left and upward. That is, the movement is relevant to a single cell in the computational array and is relevant to every cell in the array.

The computational array functionality can be best described in terms of four basic operations: image acquisition, reference image load, correlation computation, and reference image translation. The image acquisition refers to the loading of new image signals via the WDATA line 96 of each computation cell 94. In the present implementation, every 40 µs a new frame of signals, i.e., pixel values, is acquired from the photoelement array via the column transfer amplifiers and the DC removal amplifiers.

The process of loading a new image is referred to as a "frame transfer." Frame transfer takes approximately 10 µs to complete. The frame transfer control circuit asserts a signal FTB, not shown, during frame transfer. The operations of the computation array described below are coordinated with the frame transfer process by observing and synchronizing with the FTB signal. The validity of a new comparison image is signaled by the falling edge of the FTB signal. The operations described below are only appropriate when FTB is not asserted.

Loading a reference frame of pixel values is required before any image correlations can be calculated. To load the reference frame, all of the signals at the CDATA nodes 104 in the computational array must be transferred to the REFH nodes 134. This is accomplished by setting CDOUT 106 and S(0) high, and pulsing the REFLD signal on line 132. The reference frame can also be loaded from another nearest-neighbor location by asserting one of the S(1)–S(8) inputs instead of S(0). Amplifier 156 buffers the REFH node 134 from the REFDATA nodes 136. The two-dimensional array of REFDATA nodes 136 within the computational array are then collectively known as the reference frame.

After a reference frame has been loaded, the computational array is ready to compute correlations. Correlations between the reference frame of pixel values and the subsequent sample frame are computed by setting the nearest-neighbor address to the desired value and recording the resulting voltage developed across the summing resistor of the displacement tracking circuit 154. When the photoreceiver array has moved a single pixel distance from the location at which the reference frame was acquired, a strong correlation will be detected at one of the nearest-neighbor locations, since there will be a minimal level of output current. In FIG. 6, the correlation is detected to be at POSITION 7 in the array 84. Sub-pixel movements can be determined by interpolating from multiple current-output readings in two-dimensional correlation space.

It should be noted that correlations between the reference frame and itself can be computed by setting CDOUT 106 low and pulsing REFSFT 140. This causes the nearest-neighbor inputs to come from the reference frame, rather than from the sample frame.

FIG. 5 referred to the step 90 of shifting the reference frame. Navigational accuracy may be improved if a single reference frame can be used for multiple pixel movements of the photoreceiver array relative to the imaged region of interest. Due to constraints in the availability of routing area within the computational array, providing inter-cell connectivity other than with nearest-neighbor computation cells is impractical. However, to use the same reference frame for multiple pixel movements requires the ability to "reach" beyond the nearest-neighbor cells. This problem is solved with the reference frame shift at step 90.

Upon detection that the relative movement between the navigation sensor and the imaged region of interest equals or exceeds one pixel distance, the reference frame is shifted to the new location within the computational array. The shift to the new location is coincident with the detected relative movement. With the reference frame in the new location, nearest-neighbor correlations become correlations between the translated reference frame and a newly acquired sample frame. By translating the pixel values of the reference frame to new locations, inter-cell connectivity is kept to a minimum without compromising navigational accuracy.

The translation of the reference frame, identified at step 90 in FIG. 5, is accomplished among the individual computation cells of the computational array. Referring to the computation cell 94 of FIG. 7, a first step is to pulse REFSFT 140 high to sample-and-hold the REFDATA signal 136 at REFSH 138. A third buffer amplifier 158 drives REFOUT 160 with the REFSH signal. CDOUT 106 is driven low, allowing REFOUT 160 to be the output of the computation cell 94 at the NN(0) node 108.

The nearest-neighbor address is then set to select the appropriate S(0)–S(8) input from the switch control signal lines 128. For example, if the T-shaped feature 78 in FIG. 6 is detected to have moved to the right and upwardly from the time at which the reference frame 76 is acquired to the time at which the sample frame 80 is acquired, the pixel values that comprise the reference frame must be shifted from cell-to-cell to the right and upwardly. Since S(0)–S(8) signals switch the address of the cell input NNINPUT 130, S(7) must be driven high to enable movement of the pixel value from location 7 of 82 in FIG. 6 to location 0. This takes place in each computation cell of the computational array. After REFOUT 160 has settled on the NNINPUT 130 of the appropriate neighbor cell, REFLD 132 is pulsed high to sample-and-hold the translated reference values at REFH 134. After this operation has occurred in each of the computation cells of the array, the computational array is again ready to compute correlations.

We claim:

1. A method of tracking relative movement between a device and a region of interest, the method comprising steps of:

fixing a two-dimensional array of photoelements to said device such that each photoelement generates an output responsive to light energy received at said photoelement from said region of interest;

deriving frames of signals from the outputs from said array of photoelements at specific times such that successive frames have respective signals with regard to a correspondence between a particular one of said photoelements and particular signals within said successive frames, including deriving a first frame of said signals at a first specific time and deriving a second frame of said signals at a second specific time;

correlating said signals of said first frame to said signals of said second frame, including substeps of:

(a) selecting signals from said first frame in a shifted relationship to respective signals of said second frame such that said signals selected from said first frame are offset from said respective signals of said second frame by a shift amount, said shift amount having a correspondence with a shift of a single photoelement within said array of photoelements, (b) generating a correlation output responsive to said signals selected from said first frame in substep (a) and to said respective signals of said second frame, and (c) repetitively executing substeps (a) and (b) to generate a correlation output for each of a plurality of shift directions; and based on said correlation outputs generated in said correlating step, determining a relative movement between said device and said region of interest between said first specific time and said second specific time.

2. The method of claim 1 wherein said substep (c) of repetitively executing substeps (a) and (b) includes selecting eight shift directions relative to an unshifted position, thereby generating at least eight correlation outputs.

3. The method of claim 2 wherein said step of correlating said signals of said first and second frames further includes generating a ninth correlation output that is responsive to said signals of said first frame being in an unshifted relationship to respective signals of said second frame.

4. The method of claim 1 wherein said step of deriving said frames is a step of capturing frames of pixel values indicative of light energy received at said photoelements at said specific times.

5. The method of claim 4 wherein said step of correlating said signals of said first and second frames includes repetitively translating said captured second frame of pixel values relative to said captured first frame of pixel values, thereby enabling generation of one of said correlation outputs for each translation.

6. The method of claim 1 further comprising steps of storing said first frame and correlating said signals of said stored first frame to signals of a plurality of frames derived after said first frame, wherein each of said substeps (a), (b) and (c) is executed for each correlation.

7. The method of claim 1 wherein each substep (b) of generating a correlation output includes determining a value equal to a square of a difference between a signal of said first frame with a respective signal of said second frame.

8. The method of claim 1 wherein said step of fixing said two-dimensional array to said device is a step of fixing a navigation sensor array to a scanner having an image array of photoelements.

9. The method of claim 1 wherein said step of deriving said frames of signals is a step of acquiring images of said region of interest.

10. A device for tracking relative movement between said device and a region of interest, the device comprising:

a navigation sensor having a two-dimensional array of photoelements responsive to reception of light energy to define an array field of view;

first circuit means for deriving a sequence of frames of signals in which each signal in each frame of said sequence is indicative of light energy from said region of interest received at an individual photoelement at a specific time, said each frame thereby being indicative of features within said region of interest when said region of interest is in said array field of view, said first circuit means outputting said signals, each of said signals corresponding to one photoelement of said array; and second circuit means, connected to said first circuit means, for correlating first and second frames of said sequence of frames of signals that are output from said first circuit means to determine displacement of said features within said region of interest during a time period between deriving said first and second frames, said second circuit means including an array of correlation signal-generating circuits in one-to-one correspondence with said signals, each correlation-signal generating circuit receiving from said first frame the signal corresponding to an individual photoelement of said array and additionally being selectively connectable to receive from said second frame the signals corresponding to other photoelements immediately adjacent to said individual photoelement in said array, each correlation-signal generating circuit generating a correlation signal output responsive to said signal from said first frame and to said signals from said second frame, said correlation signal outputs being indicative of correlations between light energy received at said individual photoelement for deriving said first frame and light energy received at said other photoelements for deriving said second frame, thereby enabling said determination of displacement of said features.

11. The device of claim 10 further comprising an image sensor in fixed relation to said navigation sensor, said image sensor having a plurality of photoelements for forming image information of said region of interest.

12. The device of claim 11 further comprising means for position-tagging said image information based upon said outputs from said array of correlation signal-generating circuits.

13. The device of claim 10 wherein said correlation signal-generating circuits include difference-squared circuits, each having a first input from said individual photoelement of said array and having a second input sequentially connected to said other photoelements.

14. A method of tracking movement of a scanner device relative to a surface of interest to form an image of said surface, the method comprising steps of:

fixing an image sensor to said scanner device;

fixing a two-dimensional array of photoelements to said scanner device, each of said photoelements in said array having plural nearest-neighbor photoelements adjacent thereto;

forming first image information of said surface of interest using said image sensor;

forming second image information of said surface of interest using said array of photoelements;

assembling an image of said surface of interest from said first image information, including positioning said first image information based on said second image information, including substeps of:
(a) correlating patterns of surface reflectivity detected by said array of photoelements at a first specific time and a second specific time, including generating plural correlation outputs for each photoelement, said correlation outputs being responsive to light energy received at said each photoelement at said first specific time and light energy received at said nearest-neighbor photoelements of each said photoelement at said second specific time, and
(b) based on said patterns of surface reflectivity correlated in substep (a), determining a magnitude and direction of travel of said scanning device relative to said surface of interest.

15. The method of claim 14 wherein said substep of generating plural correlation outputs includes forming nine outputs that are equal to the squares of the differences between a pixel value indicative of light energy received at said each photoelement at said first specific time and nine pixel values indicative of light energy received by said nearest-neighbor photoelements and by said each photoelement at said second specific time later than said first specific time.

16. The method of claim 14 wherein said step of fixing a two-dimensional array of photoelements includes a step of fixing first and second two-dimensional arrays of photoelements to said scanner device at spatially separated locations, and wherein said substeps (a) and (b) of correlating patterns and determining said magnitude and direction of travel are executed based upon said second image information from each of said first and second arrays.

17. A scanner for forming an image of a surface of interest comprising:

a housing;

an imaging sensor fixed to said housing for capturing image information of said surface of interest;

a two-dimensional array of photoelements fixed to said housing for forming navigation information, each photoelement in said array having at least one nearest-neighbor photoelement adjacent to said each photoelement;

frame means for capturing successive frames of said navigation information from said photoelements in an arrangement such that each frame includes pixel values in which each pixel value is responsive to received light energy at a corresponding photoelement at a time of capturing said each frame;

means, connected to said frame means, for correlating each pixel value of a first frame with those pixel values of a second frame that correspond to nearest-neighbor photoelements of a photoelement with which said each pixel value corresponds.

18. The scanner of claim 17 wherein each of said two-dimensional array, said frame means and said means for correlating are formed on a single substrate.

19. The scanner of claim 17 further comprising means, connected to said means for correlating, for arranging said image information in response to detection of correlations of pixel values of said first and second frames.

20. The scanner of claim 19 further comprising a second array of photoelements fixed to said housing for forming navigation information, said second array being connected to a second frame means and a second means for correlating.

* * * * *

UNITED STATES PATENT AND TRADEMARK OFFICE
Certificate

Patent No. 5,729,008                                                                 Patented: March 17, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Travis N. Blalock, Santa Clara, CA; Richard A. Baumgartner, Aplo Alto, CA; Thomas Hormak, Portola Valley, CA; Mark T. Smith, San Mateo, CA; and Barclay J. Tullis, Palo Alto, CA.

Signed and Sealed this Twenty-ninth Day of March 2005.

DAVID P. PORTA
*Supervisory Patent Examiner*
Art Unit 2878